3,634,311
Patented Jan. 11, 1972

3,634,311
AMMONIUM HEXAFLUOROFERRATE AS A FIRE RETARDANT ADDITIVE
John A. Peterson, Niagara Falls, and Harry W. Marciniak, Tonawanda, N.Y., assignors to Hooker Chemical Corporation, Niagara Falls, N.Y.
No Drawing. Filed Mar. 21, 1969, Ser. No. 809,430
Int. Cl. C08f 45/56; C08k 1/02; C09k 3/28
U.S. Cl. 260—41.5   8 Claims

ABSTRACT OF THE DISCLOSURE

Normally combustible polymers are rendered fire retardant by incorporating therein a fire retardant amount of ammonium hexafluorotitanate, ammonium hexafluoroferrate and mixtures thereof. The degree of fire retardancy is improved by additionally employing an arsenic, antimony or bismuth compound.

BACKGROUND OF THE INVENTION

Fire retardant resins have developed considerable commercial importance. They are useful in protective coatings such as paints, varnishes, applications for insulated wire and cable fabric coatings, building and roofing materials, and the like, as well as in molding compounds. The fire retardant additive employed should be non-hydroscopic, unreactive with moisture or with other components of the formulation during handling and forming operations, be stable at molding temperatures and preferably pass from a solid to gaseous product without going through an intervening molten phase. It has now been found that ammonium hexafluorotitanate and ammonium hexafluoroferrate and mixtures thereof meet the foregoing requirements. It has also been found that these additives are superior to commercial retardant additives in the avoidance of afterglow (red glow after extinguishment of the flame), fuming or smoking, and drip. Elimination of the dripping is particularly important because the flaming material which falls from the bulk of the fire retardant material can spread flames.

It is the object of this invention to provide new fire retardant additives. It is also the object of this invention to provide fire retardant additives which are non-hydroscopic, unreactive with moisture, stable at molding temperatures and pass from solid to gaseous products without going through any intervening molten phase. A further object of the invention is to provide new fire retardant additives which provide a combination of fire retardancy, minimal afterglow, minimal-fuming and no drip. Other objects will become apparent to one skilled in the art from the following detailed description.

SUMMARY OF THE INVENTION

This invention relates to fire retardant compositions. More particularly, this invention relates to new fire retardant compositions comprising a normally combustible polymer and a fire retardant amount of ammonium hexafluorotitanate, ammonium hexafluoroferrate and mixtures thereof. In a preferred embodiment, the degree of fire retardancy is improved by additionally employing an arsenic, antimony or bismuth compound.

DESCRIPTION OF THE INVENTION

In accordance with this invention, normally combustible polymers are rendered fire retardant by incorporating therein a fire retardant amount of ammonium hexafluorotitanate, ammonium hexafluoroferrate and mixtures thereof. Typical normally combustible polymers in which the compounds of this invention find utility as an additive are homopolymers and copolymers of ethylenically unsaturated aliphatic, alicyclic and aromatic hydrocarbons such as polyethylene, polypropylene, polybutene, ethylene-propylene copolymers; copolymers of ethylene or propylene with other olefins, polybutadiene; polymers of butadiene, polyisoprene, both natural and synthetic polystyrene and polymers of pentene, hexene, heptene, octene, 2-methylpropene-1,4-methylhexene-1, bicyclo - (2.2.1) -2-heptene, pentadiene, hexadiene, 2,3-dimethylbutadiene-1, 3,4-vinylcyclohexene, cyclopentadiene, methylstyrene, and the like. Other polymers useful in the invention include polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate, alkyd resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfural-ketone); hydrocarbon resins from petroleum; isobutylene resins (polyisobutylene); isocyanate resins (polyurethanes); melamine resins such as melamine-formaldehyde and melamine-urea-formaldehyde; oleo-resins; phenolic resins such as phenol-formaldehyde, phenolic-elastomer, phenolic-epoxy, phenolic-polyamide, and phenolic-vinyl acetals; polyamide resins such as polyamides and polyamide-epoxy; polyester resins such as polyesters (unsaturated) of dibasic acids and dihydroxy compounds, and polyester elastomer and resorcinol resins such as resorcinol-formaldehyde, resorcinol-furfural, resorcinol-phenol - formaldehyde, resorcinol-polyamide and resorcinol-urea; rubbers such as natural rubber, synthetic polyisoprene, reclaimed rubber, polybutadiene, cyclized rubber, butadiene-acrylonitrile rubber, butadiene-styrene rubber, and butyl rubber; polysulfides (Thiokol); terpene resins; urea resins; vinyl resins such as polymers of vinyl acetal, vinyl acetate or vinyl alcohol-acetate vinyl acetate copolymer, vinyl alcohol, vinyl butyral, vinyl chloride-acetate copolymer and vinyl pyrrolidone; polyformaldehyde; nylon, polycarbonates of dihydroxy compounds such as bisphenols and phosgene, and thermoplastic polymers of bisphenols and epichlorohydrin (trade named Phenoxy polymers); bitumens and asphalts; and graft copolymers of polymers of unsaturated hydrocarbons and an unsaturated monomer, such as graft copolymers of polybutadiene, styrene and acrylonitrile, commonly called ABS resins.

The inorganic halogen compounds employed as additives in the instant invention are ammonium hexafluorotitanate and ammonium hexafluoroferrate. Mixtures of the two additives can also be employed and can be made from the mineral ilmenite which contains iron and titanium oxide in about equimolar proportions. It was particularly surprising to find that the ammonium hexafluorotitanate exhibited superior properties with respect to fire retardancy, afterglow, fuming and drip because when other elements of Group IV of the Periodic Table were substituted for the titaniuum in the compound, the other elements failed to pass even screening tests. For example, $(NH_4)_2SiF_6$ and $(NH_4)_2ZrF_6$ failed the screening tests. Indeed, even sodium hexafluorotitanate failed the screening tests. The ammonium hexafluorotitanate, ammonium hexafluoroferrate or mixtures thereof are incorporated into polymeric materials in an amount which can vary from about 1 to about 50 percent by weight of the polymeric composition, preferably from about 10 to about 35 percent by weight, i.e., in an effective fire retardant proportion.

The improved fire retardancy of the normally combustible polymers can be improved, if desired, by incorporating metallic compounds such as compounds of arsenic, antimony or bismuth in addition to the compounds of the instant invention in the polymers. Antimony oxide is the antimony compound that is presently preferred for use in the present invention. However, many antimony compounds are suitable. Suitable antimony compounds include the sulfides of antimony, antimonite salts of the alkali metals of Group I of the Periodic Table, antimony salts of organic acids and their pentavalent derivatives and the esters of antimonous acids and their pentavalent derivatives. It is convenient to use sodium antimonite or potassium antimonite when it is desired to use an alkali metal salt of the antimony for compositions of this invention. U.S. Pat. 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caparte, antimony cinnate, antimony anisate, and their pentavalent dihalide derivatives. Likewise, the esters of antimonous acids and their pentavalent derivatives disclosed in U.S. Pat. 2,993,924, such as tris(n-octyl) antimonite, tris(2-ethylhexyl) antimonite, tribenzyl antimonite, tris(beta-chloroethyl) antimonite, tris(beta-chloropropyl) antimonite, tris(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed, in particular the oxides of arsenic and bismuth. The metallic additives are generally employed in a proportion of about 1 to 30 percent by weight, preferably about 5 to 20 percent by weight of the polymer composition.

The components comprising the compositions of the instant invention can be mixed by any one of several methods. The ammonium hexafluorotitanate, ammonium hexafluoroferrate and mixtures thereof, and other additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually, the additives are mixed with the polymer in the molten state at temperatures that can range from the melting point to the decomposition temperature of the polymer. Alternatively, the additives and polymer are dry blended in the finely divided state so that an intimate mixture is obtained upon subsequent molding or extrusion.

The compositions of this invention are useful in protective coatings such as paints, varnishes, applications for insulated wire and cable fabric coatings, roofing materials and the like. Aside from imparting fire retardancy to the normally combustible polymers, the additives also function as a reinforcing filler for improving such properties as flexural strength and modulus and heat deflection temperatures. The fire retardant compositions of the instant invention are useful in the preparation of plastic articles in general and reinforced plastic articles containing a reinforcement such as cloth, glass fibers in the form of roving, individual glass fibers, etc. Suitable reinforcements for preparing the reinforced articles include textile fibers, glass fibers or cloth, roving, wood flour, mineral fillers, etc. In general, well-known processes of the prior art can be used for preparing the above-mentioned plastic articles and reinforced plastic articles, with the exception of substituting the compositions of the invention for that conventionally used. Usually, other changes in the process are not necessary.

The following are examples of suitable reinforcing media and fillers that can be used with the compositions of the invention: glass fibers, glass mats, glass cloth, synthetic fibers such as orlon, mineral fibers such as asbestos, natural fibers such as cotton, silk and wool, metallic fibers such as aluminum and steel, inorganic materials such as calcium carbonate, clay and pigments, and oragnic materials such as wood flour, cotton and ray flock, sisal fibers and dyes.

The following examples serve to further illustrate the invention but are not intended to limit it. Throughout the specification and claims all parts and percentages are by weight and temperatures are in degrees centigrade unless otherwise indicated.

Example 1

Ammonium hexafluorotitanate was compounded with polystyrene and antimony trioxide in the ratio of 20/70/10. This composition was tested by the ASTM D-635 method modified by hand molding in a glass tube. The modified polystyrene exhibited a self-extinguishing time of 5 seconds. Unmodified polystyrene is rated burning by this test. Afterglow had a maximum duration of about 3 seconds and no dripping of molten or flaming polymer was observed.

Example 2

Example 1 was repeated replacing the ammonium hexafluorotitanate with ammonium hexafluoroferrate. The modified polystyrene exhibited a self-extinguishing time of 3 seconds, had a maximum afterflow duration of about 3 seconds and no dripping of molten or flaming polymer was observed.

Examples 3–6

The modified ASTM D-635 test of Example 1 was repeated employing polypropylene. Unmodified polypropylene is rated burning by this test. Table I shows the ratio of polypropylene, additive and antimony trioxide, the additive employed and the self-extinguishing time.

TABLE I

| Example: | Ratio of polymer/additive/$Sb_2O_3$, weight percent | Additive | Self-extinguishing time, seconds |
|---|---|---|---|
| 3 | 70/20/10 | $(NH_4)_2TiF_6$ | 36 |
| 4 | 65/25/10 | $(NH_4)_2TiF_6$ | 2 |
| 5 | 60/27/13 | $(NH_4)_2TiF_6$ | 2 |
| 6 | 60/27/13 | $(NH_4)_3FeF_6$ | 33 |

In each example, afterglow was nil having a maximum duration of about 3 seconds. Dripping of molten or flaming polymer was not observed for any of the compositions.

Examples 7–8

Ammonium hexafluorotitanate was compounded with polypropylene and subjected to various tests, the results of which are given in Table II. In this table, fuming or smoking of the test sample was considered afterglow.

TABLE II

| Example | 7 | 8 |
|---|---|---|
| Additive | None | $(NH_4)_2TiF_6$ |
| Amount additive/$Sb_2O_3$, weight percent | 0/0 | 25/10 |
| Self-extinguishing time (ASTM D-635), seconds | (¹) | 5.3 |
| Afterglow, seconds | | <3 |
| Drip | (²) | (³) |
| Flexural strength, p.s.i. | 8,340 | 7,830 |
| Flexural modulus, ×$10^5$, p.s.i. | 2.6 | 3.31 |
| Heat distortion temperature, °C.: | | |
| At 66 p.s.i. | 107 | 127 |
| At 264 p.s.i. | 64 | 72.5 |
| Notched Izod impact strength, average foot pounds/inch of notch | 1.00 | 0.48 |

¹ Burning.  ² Yes.  ³ No.

When a fire retardant additive is added to the normally combustible polymer, the properties of the polymer are often adversely affected. Table II demonstrates an additional advantage of the compounds of this invention in their functioning as reinforcing fillers for improving such properties as flexural strength and modulus and heat distortion temperature.

Example 9

Sixty-five parts of polypropylene, 25 parts of ammonium hexafluorotitanate and 10 parts of antimony trioxide were compounded and subjected to the UL–94 flammability test (a vertical test bar) in which the sum of two self-extinguishing times and two afterglows cannot exceed 25 seconds. The titanate system passed this test with no tendency toward dripping.

Examples 10–14

Sixty parts of polypropylene, 27 parts of an inorganic fire retardant additive, and 13 parts of antimony trioxide were compounded and subjected to the modified ASTM D–635 flammability test. The additives and results of the test are given in Table III.

TABLE III

| Example: | Additive | Self-extinguishing time, seconds | Afterglow, seconds |
|---|---|---|---|
| 10 | $(NH_4)_2TiF_6$ | 1.5 | None |
| 11 | $Na_2TiF_6$ | >60 | 28 |
| 12 | $(NH_4)_2SiF_6$ | 1 to >60 | None |
| 13 | $Na_2SiF_6$ | >60 | >60 |
| 14 | $(NH_4)_2ZrF_6$ | >45 | |

The compound of the invention was vastly superior to the other compounds.

Example 15

Sixty parts of polyethylene, 27 parts of $(NH_4)_2TiF_6$ and 13 parts of antimony trioxide were compounded and subjected to the modified ASTM test. The modified polyethylene exhibited a self-extinguishing time of less than 1 second and had no afterglow.

Example 16

Seventy parts of ABS, 22 parts of $(NH_4)_2TiF_6$ and 8 parts of antimony trioxide were compounded and subjected to the modified ASTM test. The ABS sample had a self-extinguishing time of 6.8 seconds and exhibited an afterglow for 8 seconds.

Example 17

Examples 15 and 16 are repeated replacing the $(NH_4)_2TiF_6$ with $(NH_4)_2FeF_6$ and producing fire retardant polyethylene and ABS compositions.

Example 18

Test specimens were prepared by compounding 50 parts of polypropylene and 50 parts of $(NH_4)_2TiF_6$. Two additional specimens were prepared in which the $(NH_4)_2TiF_6$ was replaced by the inert fillers $CaCO_3$ and pulverized sand. A fourth sample was prepared in which the $(NH_4)_2TiF_6$ was replaced with $(NH_4)_2ZrF_6$. The sample containing the $(NH_4)_2TiF_6$ exhibited a self-extinguishing time of 1.9 seconds by the modified ASTM D–635 test and had no afterglow. All of the other samples were still burning after 45 seconds had elapsed.

Examples 19–23

Duplicate test specimens are prepared by compounding sixty parts of the normally combustible polymers listed in Table IV; twenty-seven parts of the inorganic fire retardant additive and thirteen parts of antimony trioxide. In one specimen, the inorganic additive is $$(NH_4)_2TiF_6$$

and in the duplicate, the additive is $(NH_4)_2FeF_6$. Each specimen is tested by the modified ASTM test and the polymer is shown to be rendered fire retardant.

TABLE IV

| Example: | Polymer |
|---|---|
| 19 | Butyl rubber. |
| 20 | Butadiene-styrene rubber. |
| 21 | Ethylene-propylene terpolymer. |
| 22 | Methyl cellulose. |
| 23 | Methyl methacrylate. |

Various changes and modifications can be made in the compositions and methods of the invention, certain of which preferred forms have been described herein, without departing from the spirit and the scope of the invention.

We claim:
1. A composition comprising a normally combustible polymer and an effective fire retardant amount of ammonium hexafluoroferrate.
2. The composition of claim 1 comprising a normally combustible polymer, an effective fire retardant proportion of ammonium hexafluoroferrate and an antimony compound.
3. The composition of claim 2 wherein the polymer is a polyolefin.
4. The composition of claim 3 wherein the polyolefin is polypropylene.
5. The composition of claim 3 wherein the polyolefin is polyethylene.
6. The composition of claim 2 wherein the polymer is polystyrene.
7. The composition of claim 2 wherein the polymer is a graft polymer of polybutadiene, styrene and acrylonitrile.
8. The composition of claim 2 wherein the antimony compound is antimony trioxide.

References Cited

UNITED STATES PATENTS 3,239,482   3/1966   Rapp _____ 260–41

MORRIS LIEBMAN, Primary Examiner

J. H. DERRINGTON, Assistant Examiner

U.S. Cl. X.R.

106—15 FP; 260—37 R, 37 EP, 37 M, 37 N, 37 PC, 38 R, 39 R, 39 M, 40 R, 40 TN, 41 R, 41 B, 45.75 R